[63.]
THOMAS MOORE.
Weight-Raising Machine.
No. 119,527.
Patented Oct. 3, 1871.
7 Sheets--Sheet 2.
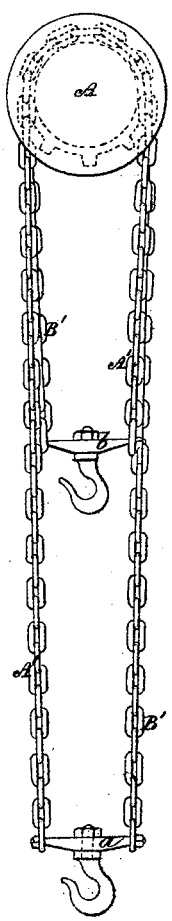
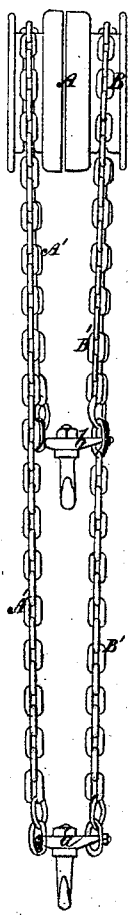
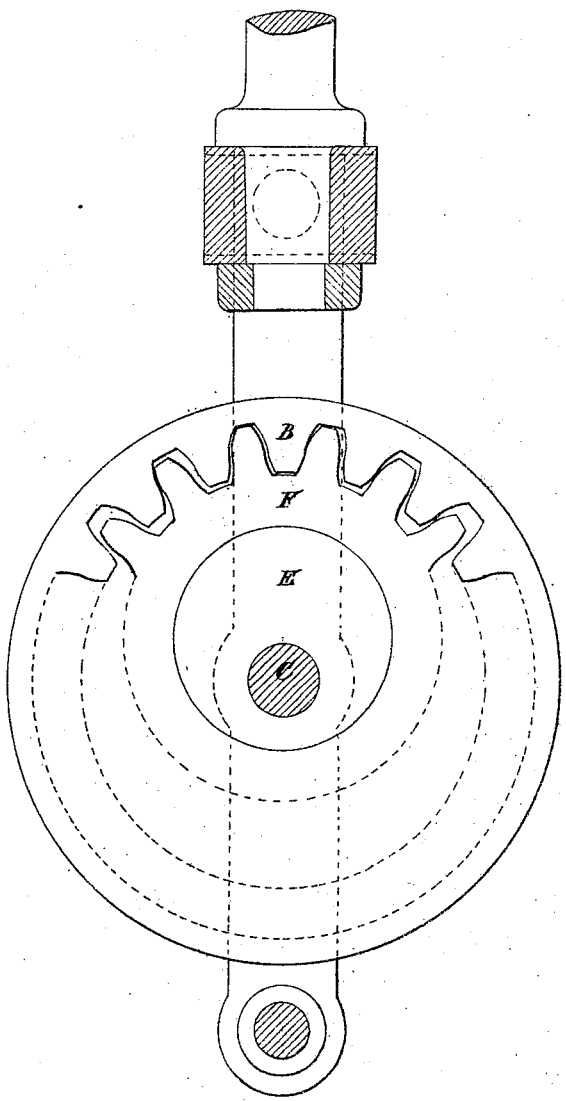
Attest:
John Trotter
Wm Sharpe
Inventor:
Thomas Moore

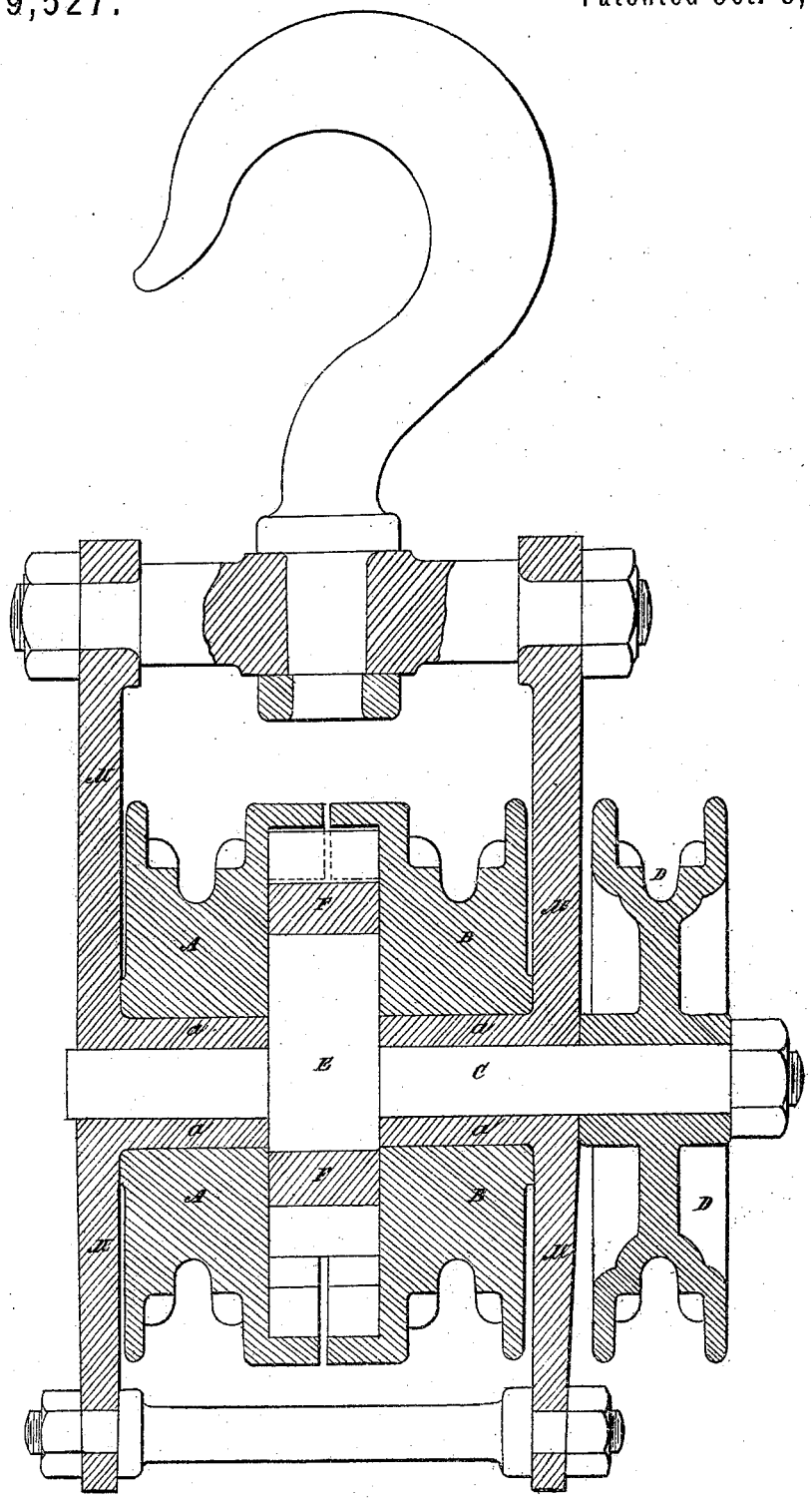

[63.] Fig. 5.
THOMAS MOORE.
Weight-Raising Machine.
No. 119,527.
Patented Oct. 3, 1871.
7 Sheets--Sheet 3.
Fig. 6.
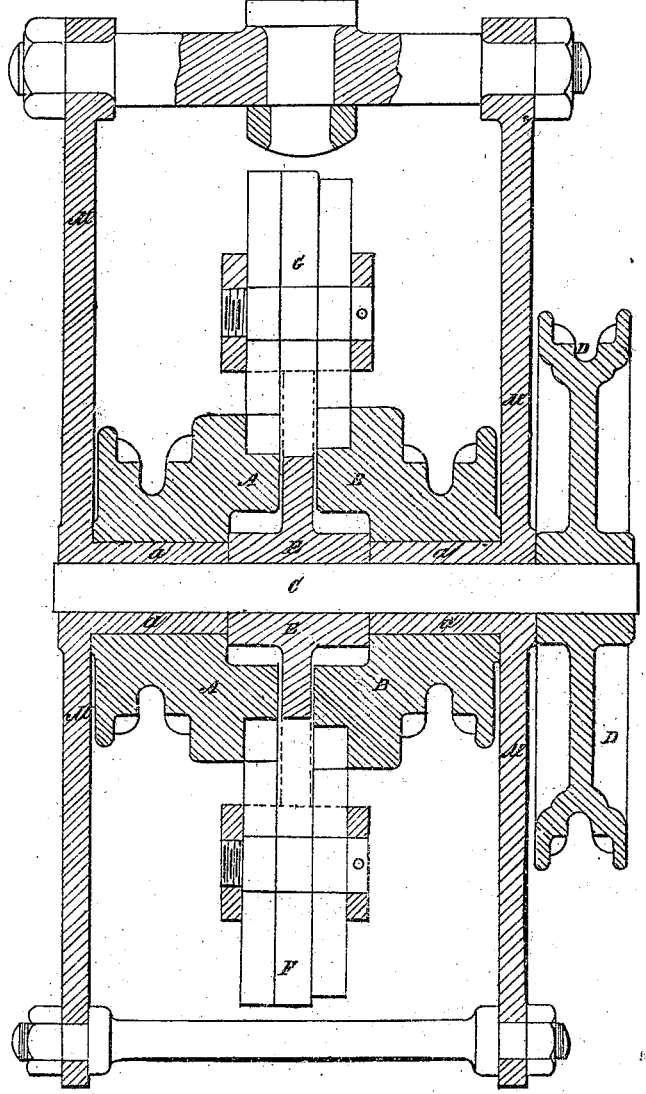
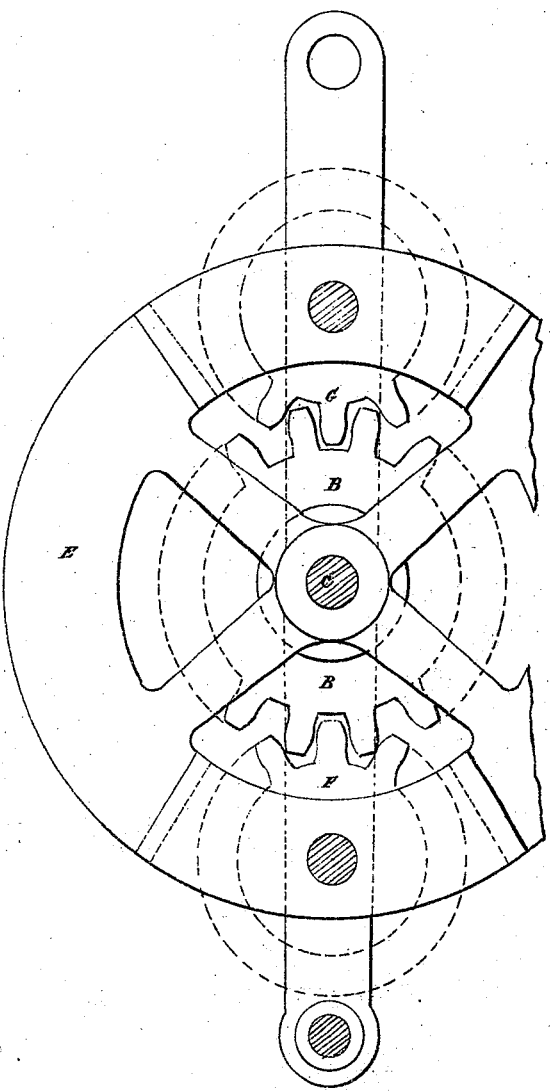
Attest:
John Trotter
W. Sharpe
Inventor:
Thomas Moore

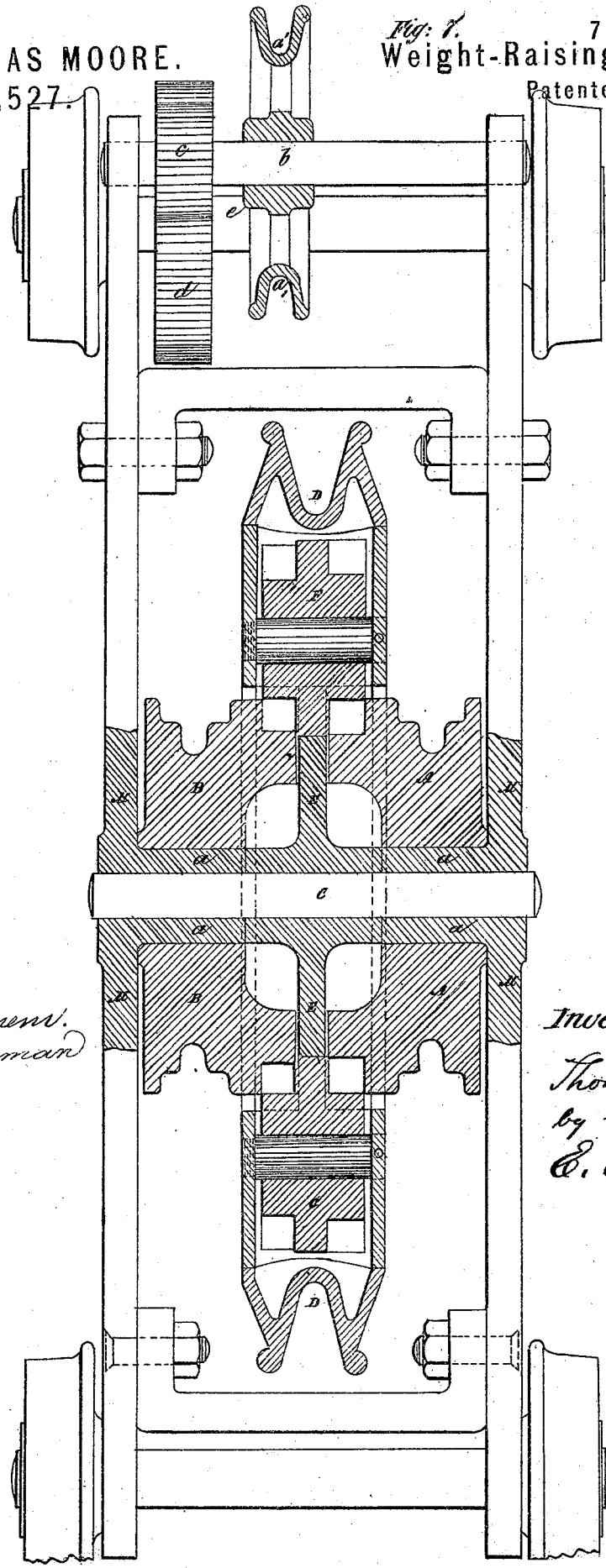

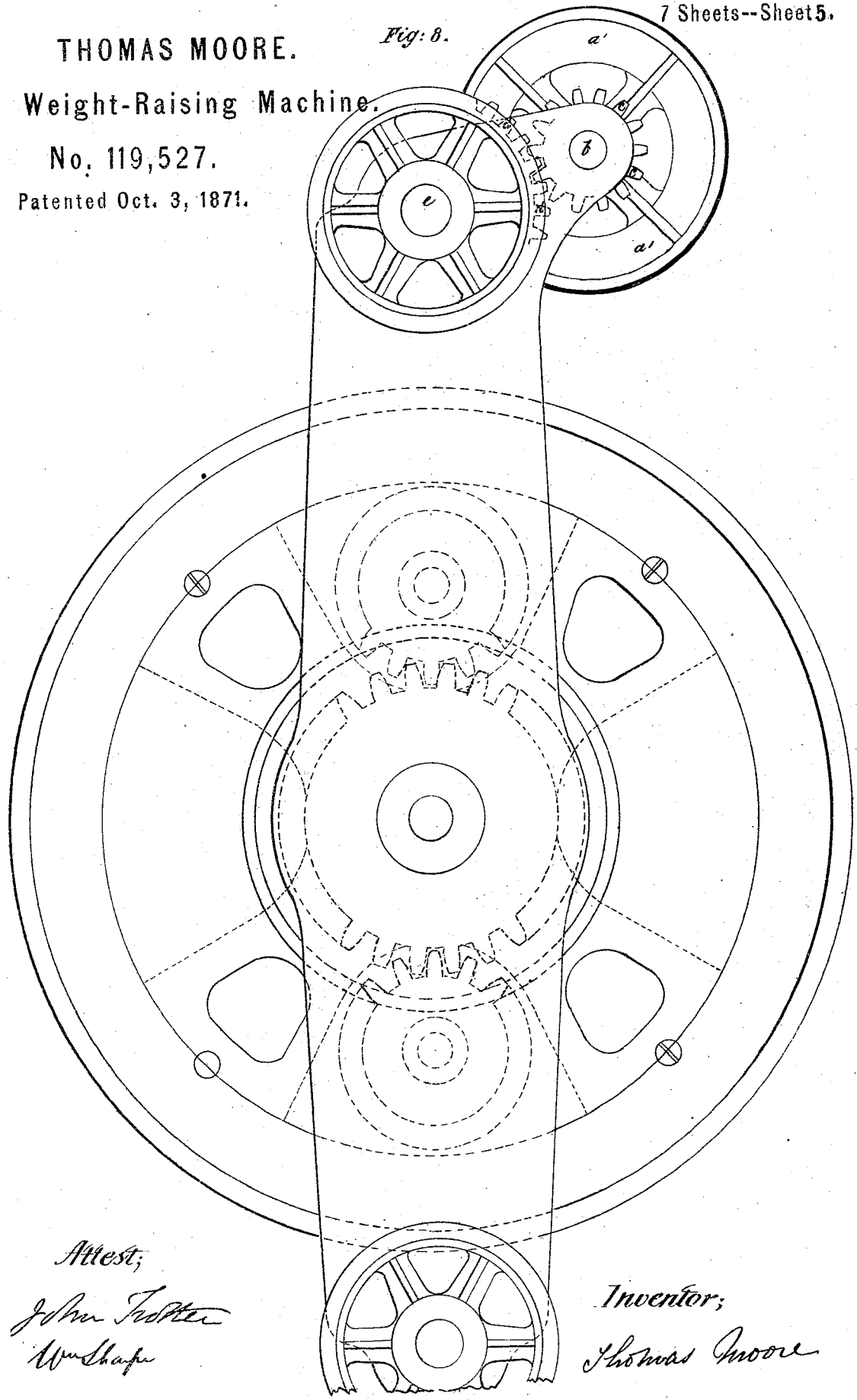

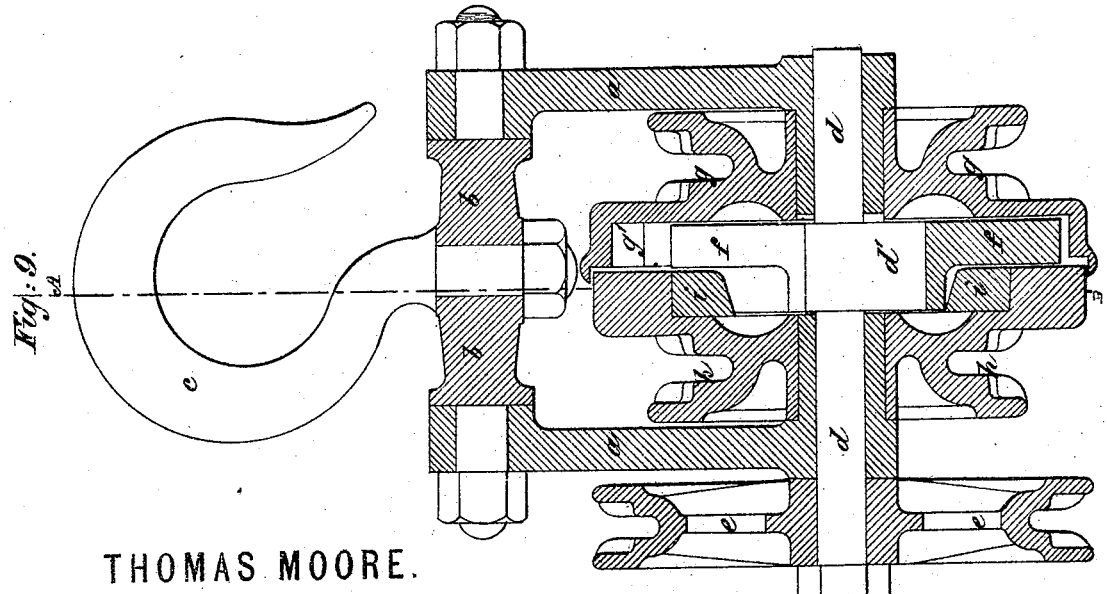
THOMAS MOORE.
Weight-Raising Machine.
No. 119,527.
Patented Oct. 3, 1871.
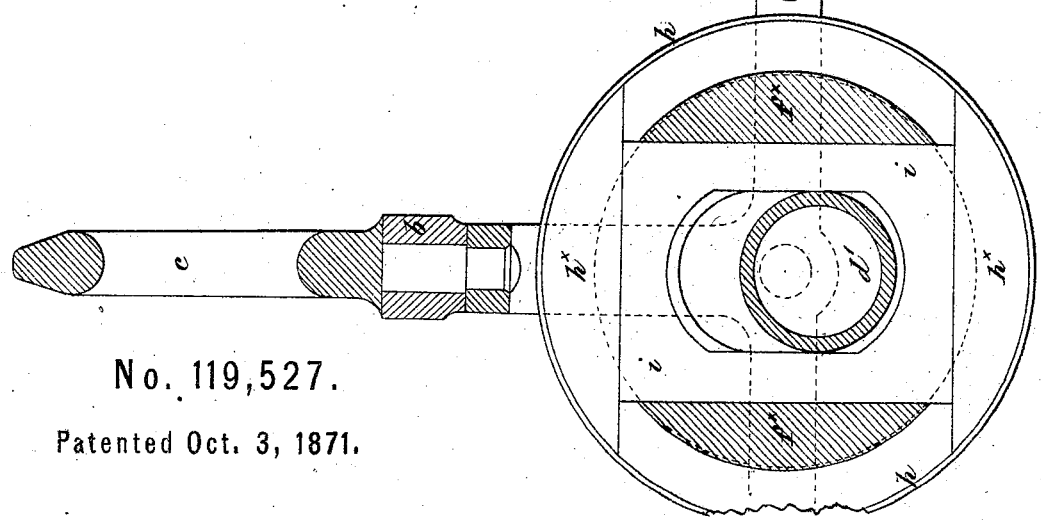
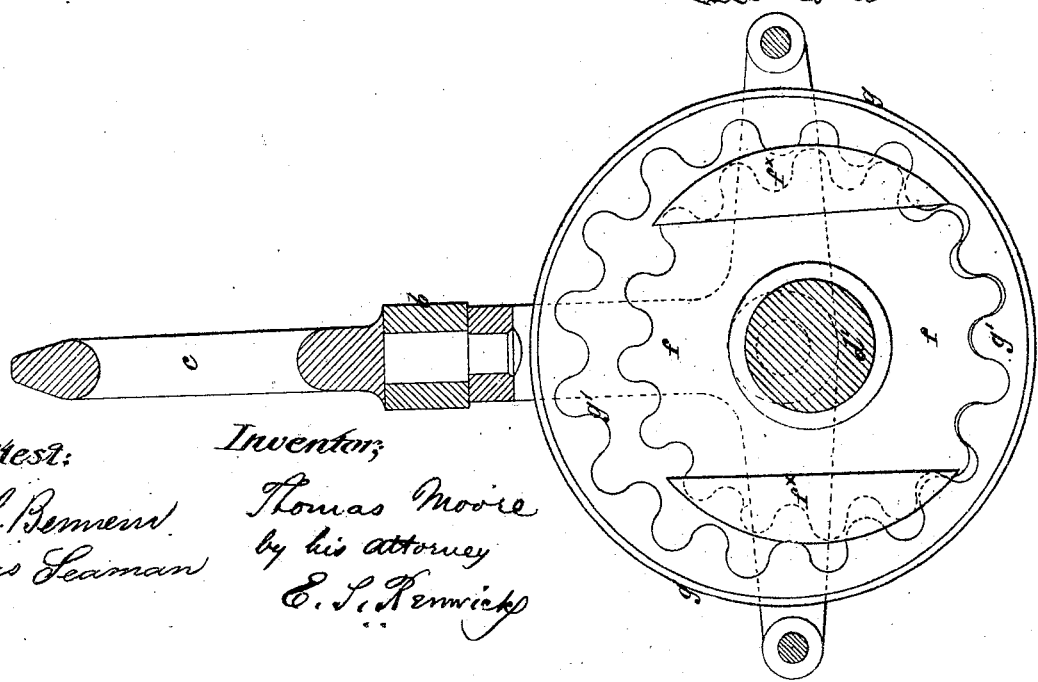
Attest:
W. L. Bement
Louis Seaman
Inventor:
Thomas Moore
by his attorney
E. S. Renwick

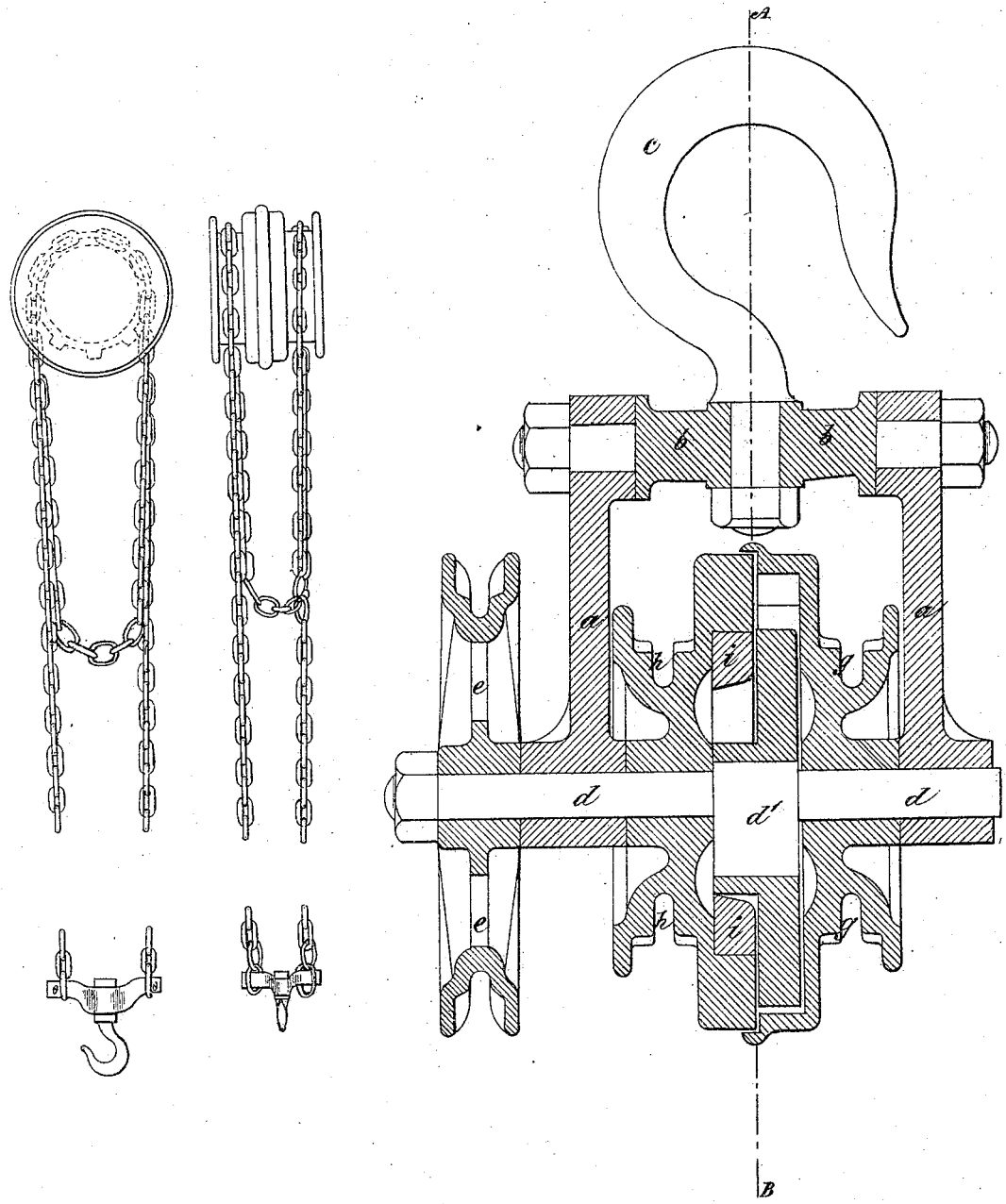

119,527

UNITED STATES PATENT OFFICE.

THOMAS MOORE, OF SOUTH STOCKTON-ON-TEES, ENGLAND.

IMPROVEMENT IN APPARATUS FOR RAISING AND LOWERING WEIGHTS.

Specification forming part of Letters Patent No. 119,527, dated October 3, 1871.

*To all whom it may concern:*

Be it known that I, THOMAS MOORE, of South Stockton-on-Tees, in the county of York, England, engineer, a subject of the Queen of Great Britain, have invented or discovered a new and useful Improvement in Apparatus for Raising and Lowering Weights; and I, the said THOMAS MOORE, do hereby declare the nature of the said invention, and in what manner the same is to be performed, to be particularly described and ascertained in and by the following statement thereof, that is to say—

This invention has for its object improvements in apparatus for raising and lowering weights.

In constructing a pulley-block two lifting chain-wheels are employed, over both of which a lifting-chain is led. The two chain-wheels were caused to revolve in opposite directions, and the ends of the two lifting-chains, which, when the wheels were rotated, would travel in the same direction, are both attached to a lifting-hook, so that both chains assist in raising the hook and weight carried by it. The chain-wheels may be driven by internal teeth upon them gearing with a pinion actuated by an eccentric. Winches overhead, cranes, and such like apparatus for raising and lowering weights may be similarly arranged.

In order that my said invention may be most fully understood and readily carried into effect, I will proceed to describe the drawing hereunto annexed.

Figure 1 is a view in vertical section, and Fig. 2 is a view in side elevation, of a pulley-block constructed according to my invention, with one side of the frame removed.

A and B are the lifting-wheels, over which the lifting-chain passes. These wheels are free to revolve on bosses $a\ a$, forged to the frame M. C is a spindle, to which the hand-chain wheel D is keyed. E is an eccentric carrying a pinion, F, which is in gear with teeth on the internal circumference of the wheels A and B. As motion is communicated to the hand chain-wheel D by the endless chain which passes round it, the same rotary motion is given to the spindle C and eccentric E. As this eccentric E revolves it carries with it the pinion F, which gears into the teeth on the lifting-wheels A and B. The number of teeth on the two lifting-wheels is different; thus, A may continually have fifteen teeth and B sixteen teeth. Thus a rotary motion is communicated to the lifting-wheels, but in contrary directions, and consequently a rising-and-falling motion to the chains thereon, and at a much less speed than that at which the chain-wheel D revolves.

Figs. 3 and 4 are views of a portion of the apparatus to show the application of the chain to the block. Supposing the chain-wheel A to be in front and the chain-wheel B behind, the chain A', connected to the bottom hook $a$, passes up and over the wheel A and down to the upper hook $b$; the chain B' leads from bottom hook $a$, passes over the wheel B, and down to top hook $b$; thus the weight is lifted with the chains passing over both pulleys, no matter which hook may be lifting the weight. Sometimes, more especially for short lifts, I dispense with one hook, in which case the chain at one end forms a simple loop. The gear may be applied externally in place of internally. In this case I employ, as before, two loose lifting-wheels, a frame carrying pinions being keyed to the spindle and placed between the lifting-wheels instead of the internal eccentric and pinion, motion being communicated to the lifting-wheels through teeth on the pinions carried by the frame gearing into the teeth on the lifting-wheels.

Fig. 5 is a vertical section, and Fig. 6 is a side elevation, partly in section, of a pulley with the gear applied externally. The action is similar to that before described. Upon motion being communicated to the hand chain-wheel D by the endless chain which passes round the same, the spindle C revolves, carrying with it the frame E and pinions F and G, the teeth of which, being in gear with the teeth on the wheels A and B, cause the latter to revolve in contrary directions, and with them the lifting-chains, from which the weights to be lifted or lowered are suspended. By either of these arrangements the heaviest weights may be lifted and left suspended without risk, and there are no fixed parts required to gain leverage, or to prevent the load running down.

Fig. 7 is a view in plan, and Fig. 8 a side elevation of a winch for an overhead crane, showing the arrangement of external gear, described with reference to Figs. 1 and 2, applied thereto. The construction, arrangement, and method of action are similar to that before described, and similar parts are marked by similar letters. The winch is shown mounted or supported on wheels running on rails, motion being communicated to the said winch by means of a pulley, $a'$, on a shaft, $b$, carrying a pinion, $c$, in gear with a wheel, $d$, on a shaft, $e$, to which one pair of the running-wheels are keyed.

It is not necessary that both chain-wheels should be furnished with teeth. By forming one chain-wheel with an internal ring of teeth, into which a pinion of somewhat smaller diameter, and formed with fewer teeth, is caused to gear, a similar result may be obtained. The pinion is mounted on an eccentric, so that by rotating the eccentric the pinion can be caused to roll around the internal ring of teeth, and so a slow rotation is obtained of the one part in relation to the other part. The second chain-wheel is connected with the pinion in such manner that the pinion (while it is left free as regards its rolling motion) can only rotate by carrying this chain-wheel with it. As the weight to be raised is hung from the two chain-wheels, these wheels divide the rotation equally between them.

Fig. 9 is a cross-section of a pulley-block thus constructed. $a\ a$ are two arms connected together by a cross-head, $b$, so as to form a frame to which the hook $c$ is attached. The frame carries in a long bearing the axis $d$, on which is fixed the chain-wheel $e$, and an endless hand-chain passes around this wheel. By means of the hand-chain the axis $d$ can be rotated when desired, and it has formed upon it the eccentric $d'$. $f$ is a pinion mounted on the eccentric, and the eccentric, when rotated within it, gives to it a rolling motion. $g$ is a chain-wheel mounted on the bearing around the axis $d$. It is provided with a ring of internal teeth, $g'$, as is more clearly seen at Fig. 10, which is a section taken at the line A B, Fig. 9, looking toward the right hand. When the eccentric $d'$ is turned, the pinion $f$ rolls around the ring of teeth $g'$, and as the number of teeth of the one is different by one tooth (or it might be by more) from that of the other, a slow rotation is obtained. $h$ is another chain-wheel mounted in the same way as the chain-wheel $g$, but on the other side of the pinion $f$, with which it is clutched by the coupling-plate $i$ in such manner that the pinion can only rotate by carrying the chain-wheel $h$ with it. The coupling-plate $i$ is clearly seen at Fig. 11, which is a section taken at the line A B, Fig. 9, looking toward the left hand. The coupling-plate $i$ is fitted in guides $h^\times$ in the chain-wheel $h$, so that it may be able to slide to and fro therein; and the pinion $f$ has jaws $f^\times$, which receive the plate $i$ between them, but allow the pinion to slide along the plate in a direction at right angles to that in which the plate $i$ slides in the guides $h^\times$.

Fig. 12 is a cross-section of a similar pulley-block, but with the chain-wheels $g$ and $h$ mounted on the axis $d$ in place of on the bearings of the frame.

Having thus described the nature of my invention, and the manner of performing the same, I would have it understood that I claim—

1. The combination, in an apparatus for raising weights, of two chain-wheels (for the lifting-chains) with connecting gearing, constructed to operate substantially as before set forth, so that the said two chain-wheels are driven simultaneously in opposite directions.

2. The combination, in apparatus for lifting weights, of the two chain-wheels, (for the lifting-chains,) the connecting gearing, and the hand chain-wheel, all constructed to operate substantially as before set forth, so that the turning of the hand chain-wheel, or its equivalent, causes the two lifting chain-wheels to turn simultaneously in opposite directions.

3. The combination of the two lifting chain-wheels, (for lifting-chains,) the gearing connecting them so that they are caused to revolve simultaneously in opposite directions, and the spindle by means of which (and the gearing) power is imparted simultaneously to the said lifting chain-wheels, the whole operating substantially as before set forth.

4. The combination of the two lifting chain-wheels, the connecting gearing by means of which the said wheels are caused to revolve simultaneously in opposite directions, and the two connected chains for said wheels, the whole operating substantially as before set forth.

THOMAS MOORE.

Witnesses:
JOHN TROTTER,
WM. SHARP.

(63)